US008682025B2

(12) United States Patent
Cvetkovic et al.

(10) Patent No.: US 8,682,025 B2
(45) Date of Patent: Mar. 25, 2014

(54) METHOD FOR CONSTRUCTING A COMPOSITE IMAGE INCORPORATING A HIDDEN AUTHENTICATION IMAGE

(75) Inventors: Slobodan Cvetkovic, Lake Worth, FL (US); Thomas C. Alasia, Wellington, FL (US); Alfred J. Alasia, Royal Palm Beach, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 263 days.

(21) Appl. No.: 13/270,738

(22) Filed: Oct. 11, 2011

(65) Prior Publication Data

US 2012/0087538 A1    Apr. 12, 2012

Related U.S. Application Data

(60) Provisional application No. 61/391,843, filed on Oct. 11, 2010, provisional application No. 61/461,224, filed on Jan. 14, 2011.

(51) Int. Cl.
*G06K 9/00*  (2006.01)

(52) U.S. Cl.
USPC ........................................... 382/100

(58) Field of Classification Search
None
See application file for complete search history.

(56) References Cited

U.S. PATENT DOCUMENTS

| 4,198,147 | A | | 4/1980 | Alasia | |
|---|---|---|---|---|---|
| 5,708,717 | A | * | 1/1998 | Alasia | 380/51 |
| 6,760,464 | B2 | | 7/2004 | Brunk | |
| 6,859,534 | B1 | | 2/2005 | Alasia | |
| 6,980,654 | B2 | | 12/2005 | Alasia et al. | |
| 6,983,048 | B2 | | 1/2006 | Alasia et al. | |
| 6,985,607 | B2 | | 1/2006 | Alasia et al. | |
| 7,114,750 | B1 | | 10/2006 | Alasia et al. | |
| 7,262,885 | B2 | | 8/2007 | Yao | |
| 7,386,177 | B2 | | 6/2008 | Alasia et al. | |
| 7,421,581 | B2 | | 9/2008 | Alasia et al. | |
| 7,466,876 | B2 | | 12/2008 | Alasia | |
| 7,512,249 | B2 | * | 3/2009 | Alasia et al. | 382/100 |
| 7,512,280 | B2 | | 3/2009 | Alasia et al. | |
| 7,551,752 | B2 | | 6/2009 | Alasia et al. | |
| 7,630,513 | B2 | | 12/2009 | Alasia et al. | |
| 7,654,580 | B2 | | 2/2010 | Alasia et al. | |
| 7,796,753 | B2 | * | 9/2010 | Alasia et al. | 380/51 |
| 2005/0100204 | A1 | * | 5/2005 | Afzal et al. | 382/135 |

(Continued)

OTHER PUBLICATIONS

International Search Report and the Written Opinion of the ISA mailed on Feb. 27, 2012 in PCT Application No. PCT/US11/55787, international filing date Oct. 11, 2011. (11 pages).

*Primary Examiner* — Nancy Bitar
(74) *Attorney, Agent, or Firm* — Novak Druce Connolly Bove + Quigg LLP

(57) ABSTRACT

A method is provided for constructing a composite image having an authentication image formed therein. The authentication image is viewable using a decoder lens having one or more decoder lens frequencies. The method comprises generating a first plurality of component images in which corresponding tonal areas are tonally balanced around at least one tonal value. At least one of the component images is configured to include a representation of the authentication image. The method further comprises determining a pattern of component image elements for each of the component images. The pattern having at least one element frequency that is equal to or a multiple of a decoder lens frequency. At least a portion of the content of each component image element is extracted and used to construct a composite image element.

26 Claims, 14 Drawing Sheets

Lenticular Lens Element Patterns

Fly's Eye Lens Element Patterns

(56) References Cited

U.S. PATENT DOCUMENTS

| | | |
|---|---|---|
| 2005/0109850 A1 | 5/2005 | Jones |
| 2005/0237577 A1* | 10/2005 | Alasia et al. ............. 358/3.28 |
| 2007/0003294 A1 | 1/2007 | Yaguchi et al. |
| 2007/0057061 A1* | 3/2007 | Alasia et al. ............. 235/454 |
| 2007/0248364 A1* | 10/2007 | Wicker et al. ............. 399/1 |
| 2008/0044015 A1 | 2/2008 | Alasia |
| 2008/0267514 A1* | 10/2008 | Alasia et al. ............. 382/232 |

\* cited by examiner

Lenticular Lens Element Patterns

Fly's Eye Lens Element Patterns

Component Image 1  Component Image 2

Component Image 1  Component Image 2

Composite Image

METHOD FOR CONSTRUCTING A COMPOSITE IMAGE INCORPORATING A HIDDEN AUTHENTICATION IMAGE

CROSS REFERENCE TO RELATED APPLICATIONS

This application claims priority to U.S. Provisional Application 61/391,843, filed Oct. 11, 2010 and U.S. Provisional Application 61/461,224, filed Jan. 14, 2011, the complete disclosures of which are incorporated herein by reference in their entirety. This application is directed to subject matter related to the technology disclosed in the following U.S. Patents, the complete disclosures of which are incorporated herein by reference in their entirety: U.S. Pat. No. 5,708,717, issued Jan. 13, 1998, U.S. Pat. No. 7,466,876, issued Dec. 16, 2008, and U.S. Pat. No. 7,512,249, issued Mar. 31, 2009.

FIELD OF THE INVENTION

The invention relates generally to the field of counterfeit protection, and more particularly to the field of electronic and printed document protection using encoded images.

BACKGROUND OF THE INVENTION

Document falsification and product counterfeiting are significant problems that have been addressed in a variety of ways. One of the more successful approaches has been the use of latent or hidden images applied to or printed on objects to be protected. These images are generally not viewable without the assistance of specialized devices that render them visible.

One approach to the formation of a latent image is to optically encode the image so that, when applied to an object, the image can be viewed through the use of a corresponding decoding device. Such images may be used on virtually any form of printed document including legal documents, identification cards and papers, labels, currency, stamps, etc. They may also be applied to goods or packaging for goods subject to counterfeiting.

Objects to which an encoded image is applied may be authenticated by decoding the encoded image and comparing the decoded image to an expected authentication image. The authentication image may include information specific to the object being authenticated or information relating to a group of similar objects (e.g., products produced by a particular manufacturer or facility). Production and application of encoded images may be controlled so that they cannot easily be duplicated. Further, the encoded image may be configured so that tampering with the information on the document or label is readily apparent.

Authentication of documents and other objects "in the field" has typically required the use of separate decoders such as lenticular or micro-array lenses that optically decode the encoded images. These lenses may have optical characteristics that correspond to the parameters used to encode and apply the authentication image and may be properly oriented in order for the user to decode and view the image. The decoding lenses may also be able to separate secondary images from the encoded images. For example, the decoding lens can be a lenticular lens having lenticules that follow a straight line pattern, wavy line pattern, zigzag pattern, concentric rings pattern, cross-line pattern, aligned dot pattern, offset dot pattern, grad frequency pattern, target pattern, herring pattern or any other pattern. Other decoding lenses include fly's eye lenses and any other lens having a multidimensional pattern of lens elements. The elements of such lenses can be arranged using a straight line pattern, square pattern, shifted square pattern, honey-comb pattern, wavy line pattern, zigzag pattern, concentric rings pattern, cross-line pattern, aligned dot pattern, offset dot pattern, grad frequency pattern, target pattern, herring pattern or any other pattern. Examples of some of these decoding lenses are illustrated in FIG. 1.

In some cases, lens element patterns and shapes may be so complex that it they are impossible or impractical to manufacture. While such patterns may be highly desirable from the standpoint of their anti-counterfeiting effectiveness, cost and technology difficulty in their manufacture may limit their use.

SUMMARY OF THE INVENTION

The present invention provides methods for constructing a digital encoded image in the form of a composite image constructed from a series of component images. An aspect of the invention provides a method for constructing a composite image having an authentication image formed therein. The authentication image is viewable by placement of a decoder lens having a plurality of lens elements defining one or more decoder lens frequencies over an object to which the composite image has been applied. The method comprises generating a first plurality of component images in which corresponding tonal areas are tonally balanced around at least one tonal value. At least one of the component images is configured to include a representation of the authentication image. The method further comprises determining a pattern of component image elements for each of the component images. The pattern includes an element configuration and at least one element frequency that is equal to or a multiple of one of the decoder lens frequencies. The component image elements for a given component image collectively carry all the content of that component image. The method still further comprises extracting at least a portion of the content of each component image element of each component image and constructing a composite image having a pattern of composite image elements. The pattern of composite image elements has the at least one element frequency that is equal to or a multiple of one of the decoder lens frequencies. Each composite image element includes the extracted content from a component image element from each component image in a location in the component image that corresponds to the location in the composite image.

Another aspect of the invention provides an authenticatable object comprising a receiving surface configured for receiving a composite security image and a composite security image applied to the receiving surface. The composite security image comprises a plurality of composite elements each comprising a subelement extracted from a component element of each of a plurality of component images in which corresponding tonal areas are tonally balanced around at least one tonal value. At least one of the component images is configured to include a representation of an authentication image. The composite elements and the component elements of each of the component images are formed in a pattern having a frequency corresponding to a lens frequency of a multi-element decoder lens, so that if the decoder lens is placed over the composite security image, the authentication image is viewable through the decoder lens.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
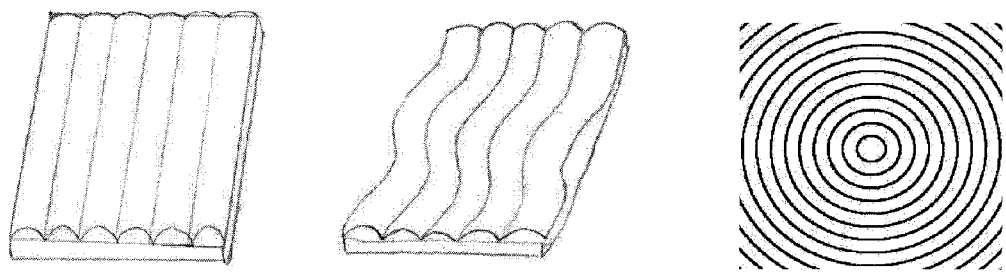
FIG. 1 is an illustration of lens element patterns that may be used to view images produced using a method of the invention.
Figure 1:
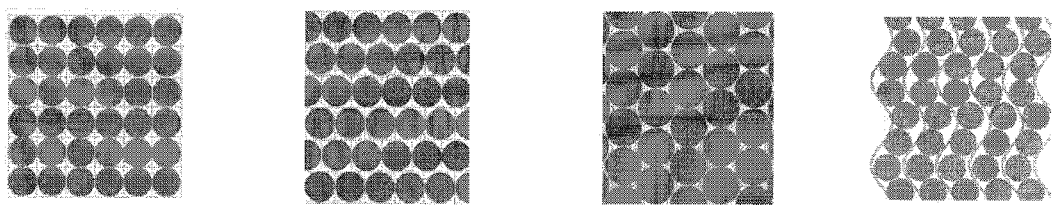

The present invention provides for the encoding and decoding of encoded images. In some embodiments, an authentication or other image is broken into component images that are preferably tonal complements of one another; i.e., they are balanced around a particular color shade. The component images are then systematically sampled and the sampled portions assembled to provide a composite image that appears to the eye to be a single tone image (the single tone being the particular color shade). As will be discussed, the samples are taken according to a pattern of the decoder lens that will be used to view the authentication image In some embodiments, multiple authentication images may be used, each such image being used to establish multiple component images. Samples from each component of each authentication image can then be used to form a single composite image that can be decoded to reveal the authentication images.

In some embodiments, an authentication image can be "hidden" within a visible source image by constructing a composite image as described above and applying the composite image to the source image as a halftone screen. In other embodiments, an authentication image may be hidden within a source image by creating a composite from samples of component images derived from the source image. In these component images, certain areas are masked according to the content of the image to be hidden. The tonal value of the masked area of each component image is taken from the masked area of one of the other component images.

The principles of the invention will now be discussed in more detail. As discussed above, the invention provides an encoded image in the form of a composite image constructed from multiple component images. The invention also provides methods of using a multiple component approach for hiding information into a composite image.

The use of component images takes advantage of the fact that the human eye is unable to discern tiny details in an encoded image. The encoded image is usually a printed or otherwise displayed image. The human eye tends to merge the fine details of the printed or displayed image together. This is generally used in printing photos and other images. The printer produces a lot of tiny dots or other structures on the paper. The size of individual dots can be measured as small as thousands of an inch. These individual dots are not perceptible for human vision; however, taken together these dots will be averaged out by human eye to create a shade of color. The size of the dots or the density of the dots will determine the perceived color shade. If dots are bigger, or if they are closer together, the eye will perceive the darker shade. If the dots are smaller, or if they are placed further apart, the eye will perceive the lighter shade.

In the methods of the invention, an authentication or other image can be broken into tonally complementary component images. The term "tonally complementary" means that the component images are balanced around a particular color shade. This means that if corresponding elements (i.e., elements from corresponding locations) of the component images are viewed together, the eye will perceive the color shade around which the component tones are balanced.

Figure 2A:
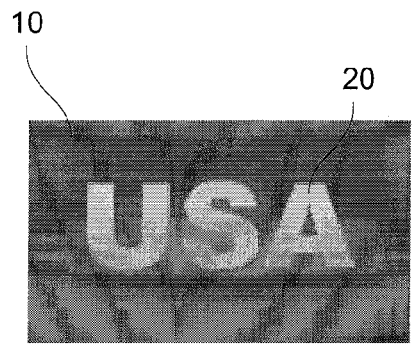
FIG. 2 is an illustration of component images used to produce a composite image according to an embodiment of the invention.
Figure 2A:
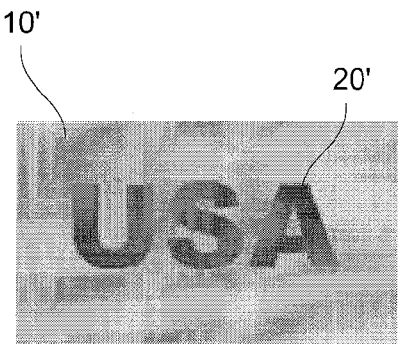

FIG. 2A shows first and second component images defining an authentication image. In component image 1, a solid background 10 with a first tonal shade surrounds an area 20 with a second tonal shade that defines the authentication image (the block letters "USA"). In component image 2, the tonal values are reversed; that is, the background area 10' has the second tonal shade and the area 20' forming the letters USA has the first tonal shade. The first and second tonal shades are balanced around a single shade so that if the component images are combined, the naked eye will perceive only that single shade. Each component image may be referred to as a "phase" of the original image.

Figure 2B:
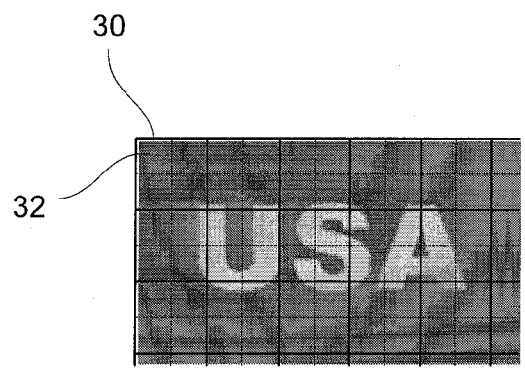
Figure 2B:
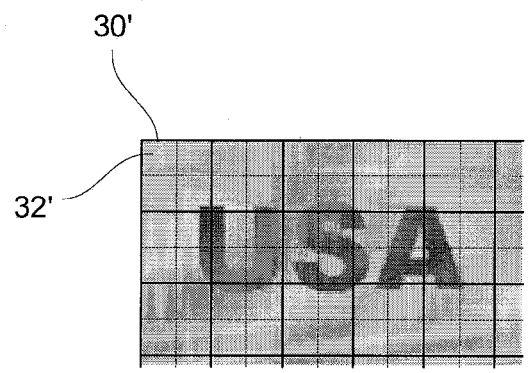

In an exemplary method of the invention, each of the phases can be divided into small elements according to a pattern corresponding to a lens element pattern of a decoder lens. These elements may, for example, be linear (straight or curved) elements or segments that correspond to the lens elements of a lenticular lens or may be in the form of a matrix of two dimensional elements corresponding to a multiple-element lens such as a fly's eye lens. In the example shown in FIG. 2B, the component images are divided into an array of square elements 30, 30', which could, for example, correspond in size and position to the elements of a fly's eye lens.

the decoding lens. For example, the sampling of the component image may have the same, twice, or three times the frequency of the decoding elements.

In the example shown in FIG. 2, alternating portions of the component image were used to form the composite image. The matrix pattern thus appeared like this:

| Component 1 | Component 2 | Component 1 | Component 2 | Component 1 | Component 2 |
| Component 2 | Component 1 | Component 2 | Component 1 | Component 2 | Component 1 |
| Component 1 | Component 2 | Component 1 | Component 2 | Component 1 | Component 2 |
| Component 2 | Component 1 | Component 2 | Component 1 | Component 2 | Component 1 |
| Component 1 | Component 2 | Component 1 | Component 2 | Component 1 | Component 2 |
| Component 2 | Component 1 | Component 2 | Component 1 | Component 2 | Component 1 |

The component element pattern has a frequency that corresponds to the element frequency (or one of the element frequencies) of the lens. It may have the same frequency (or frequencies for a multi-dimensional pattern) as the element frequency (or frequencies) of the lens or may have a frequency that is a multiple of the of the lens element frequency.

Figure 2C:
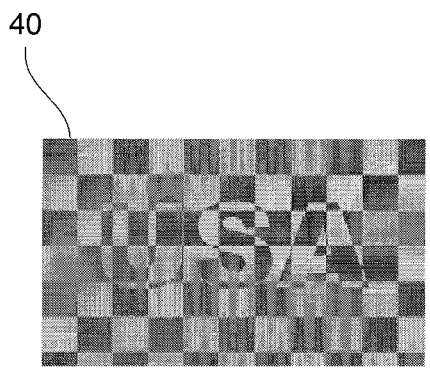

As shown in FIG. 2C, the elements 30, 30' of the two component images may be systematically divided into subelements 32, 32' from which samples can be taken and combined to form a composite image 40 having an average tone that matches that of the shade around which the two component images were balanced. In the example shown in FIG. 2C, the elements and subelements are so large that the authentication image is readily apparent. It will be understood, however, that if the elements of the composite images are small enough, the human eye will merge them together so that only a single uniform color shade is perceived.

Although the composite image would appear to the naked eye to be a single uniform tone, when a decoder lens having a frequency, shape and geometrical structure corresponding to the component image elements is placed in the correct orientation over the image, the decoder separates the portions of the composite image contributed by each of the component images. This allows the authentication image to be viewed by a human observer looking through the decoder. The decoder elements may have magnifying properties and the particular component that is viewed by the observer may change depending on the angle of view through the decoder. thus, from one angle, the viewer may see a light background with a dark inset and from an other angle, he may see the reverse.

The example component images of FIG. 2 use two color shades. It will be understood, however, that the number of color shades is unlimited. The only requirement is that if the composite image is to produce a single apparent tonal value, then the tonal values for corresponding elements of the two component images must all be balanced around that single tonal value. Component images may also be balanced around multiple tonal values, in which case, the resulting composite image will have multiple apparent tonal values.

In some embodiments like that exemplified in FIG. 2, the composite image may be designed to work with fly's eye lenses arranged in an array with a square or rectangular grid. It will be understood, however, that the lens elements may be formed in virtually any pattern (symmetric or asymmetric, regularly or irregularly spaced) and have any shape. The size of the elements of the composite image may be determined by the size of the elements in the decoding lens. As noted above, the frequency of the sampling of the component images may be done using a multiple of the frequency of lens elements in It will be understood that other systematic approaches of collecting and ordering portions of the component images to form the composite image and/or the elements inside the composite image may be utilized. FIG. 3, for example, illustrates an approach to collecting and ordering portions of the component images 100, 100' to form elements of the composite image 100". The component images 100, 100' may be constructed using tonal values balanced around one or more tonal values, with the balanced values used to define an authentication image.

Figure 3A:
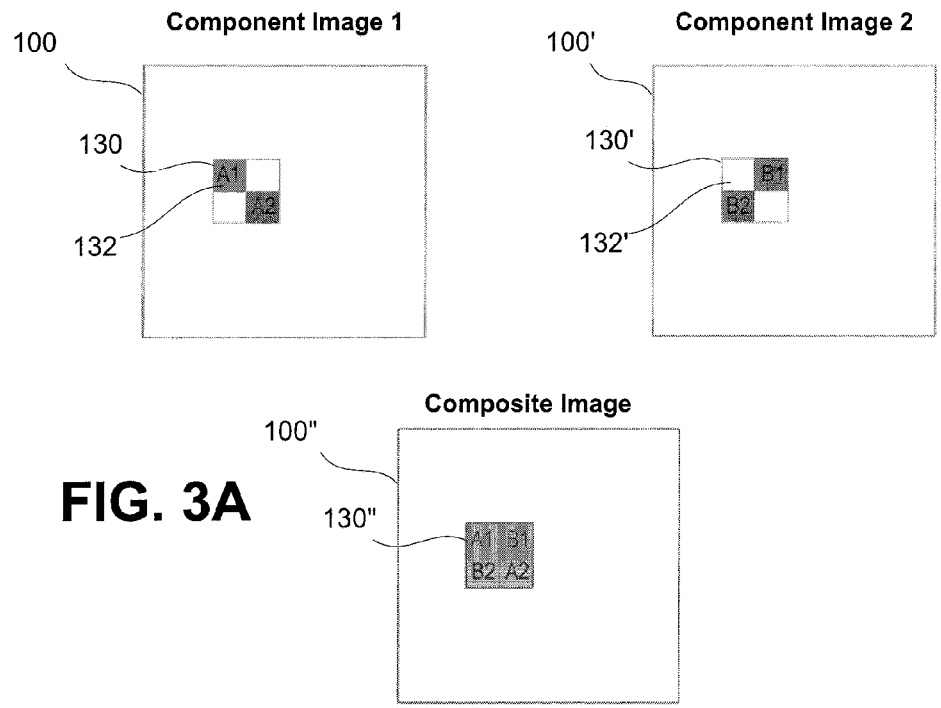
FIG. 3 is a schematic representation of component image elements produced in a method of producing a composite image according to an embodiment of the invention.
Figure 3B:
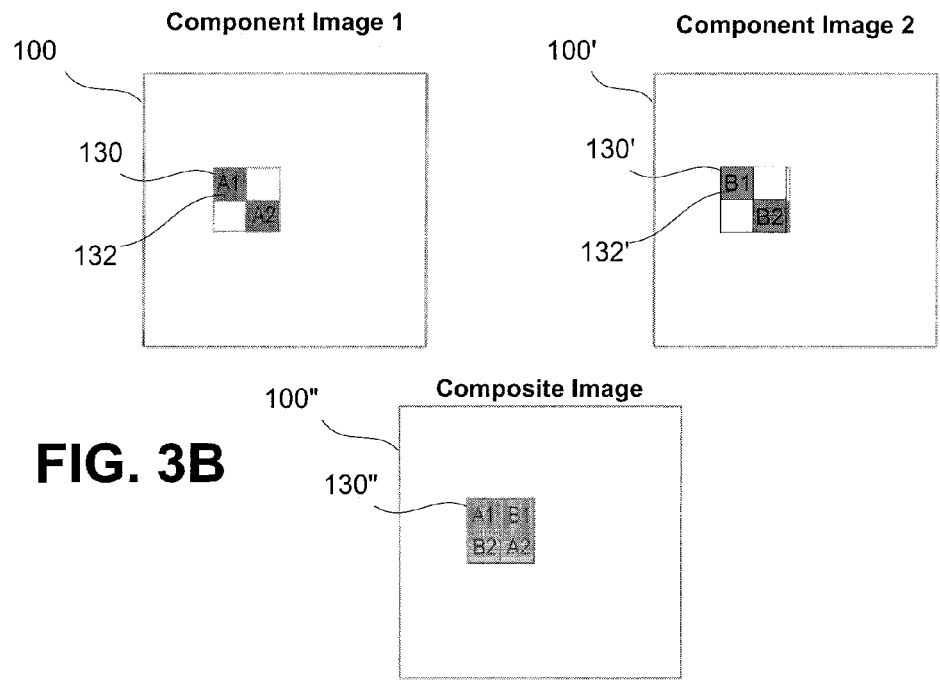

In the examples of FIG. 3, the component images 100, 100' are divided into elements 130, 130' each having a 2×2 pattern of subelements 132, 132', similar to the pattern used in the example of FIG. 2. It will be understood that while only a single exemplary element 130, 130' is shown for each component 100, 100', the method involves dividing the entire images into a grid of such components. Diagonally opposed subelements A1 and A2 are then taken from each element (or cell) 130 of the first component image 100 and diagonally opposed subelements B1 and B2 are taken from the corresponding element 130' of the second component image 100'. The B1 and B2 portions may be selected so that they differ in exact location from the A1 and A2 portions, as shown in FIG. 3A. Alternatively, the B portions may be taken from the same locations as the A portions as shown in FIG. 3B. In either case, the selected portions are then used to construct a composite image 100". In the example of FIG. 3A, the subelements may all be placed in the corresponding element 130" of the composite image 100' in the exact locations from which they were taken. In the Example of FIG. 3B, the B subelements may be positioned in a slightly different location in the composite image from where they were taken in order to fill out the element 130". In both examples, however, the four subelements are all taken from the same cell location. This assures that the corresponding cell 130" in the composite image 100" will have the same apparent tonal value in either case.

It will be understood by those of skill in the art that the subelements 132, 132' do not have to be square or any other specific shape including but not limited to any polygon, circle, semicircle, ellipse and combinations or portions thereof. The component elements 130, 130' could for example be divided into two or four triangles. They could also be formed as two rectangles that make up a square element. For images to be viewed using a fly's eye lens, the component elements (or portions thereof) can be sized and shaped to correspond to the shape of the lens elements and any combination of subelement shapes can be used that combine to form the corresponding element shape. It would even be possible to mix different shapes, as long as the tonal balance is maintained. Different sized subelements may also be used. Even if the total areas belonging to each of the components are not equal, the disparity can be compensated by using a darker tone for one of the components. For example, 50% area at 60% density for the first component and 50% are at 40% density for the second component will give a 50% overall tint. However, using a 75% area at 60% density for the first component and 25% area at 20% density for the second component will also be perceived as 50% overall tint density. Another approach would be to use a different number of subelements from different components. For example, two subelements can be taken from the first component and four from the second component, as long as the tonal balance is maintained.

It will also be understood that in these embodiments, there are two component images. Thus, half of each component image is used to form the composite image.

Figure 4:
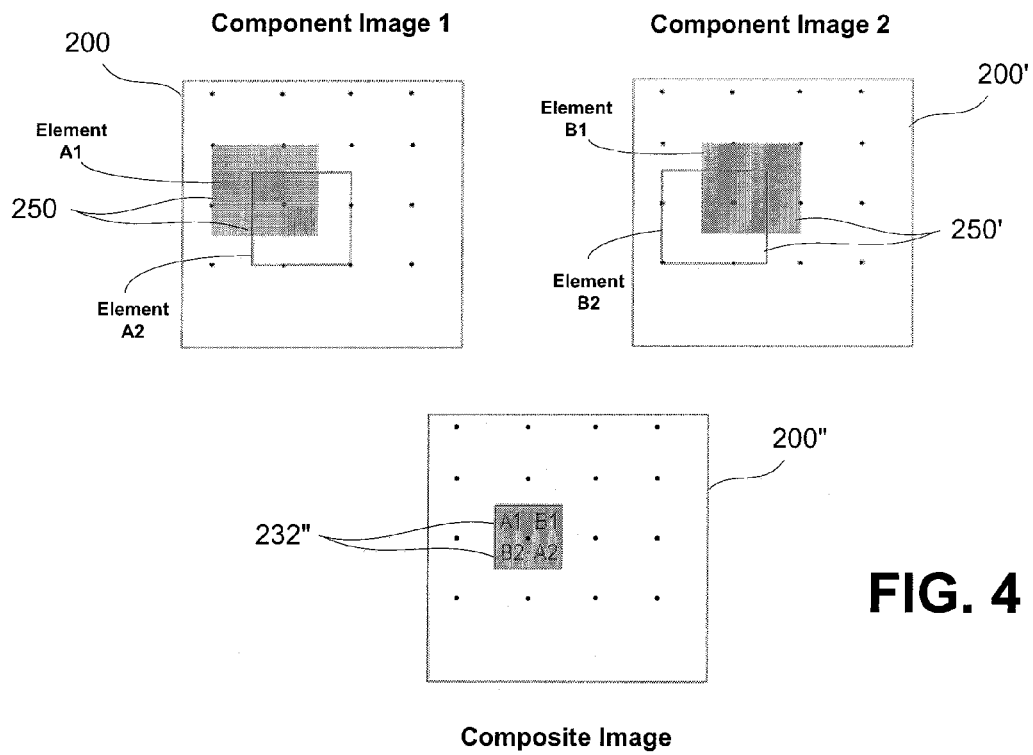
FIG. 4 is a schematic representation of component image elements produced in a method of producing a composite image according to an embodiment of the invention.

FIG. 4 illustrates an embodiment that produces a scrambling effect in the composite image. In this approach, larger, overlapping sample portions are taken from each component image and reduced in size so as to form non-overlapping pieces of a composite image.

The difference in sizes between the portions of the component image and the elements of the composite image may be referred to as a zoom factor or element reduction factor. For example, for a zoom factor of three, while the size of the elements of the composite image may be similar to that illustrated in FIG. 3, the size of the portions of the component images would be three times larger. In this example, the size of the portions of the component images are shrunk down three times to before being inserted into the composite image.

FIG. 4 illustrates first and second component images 200, 200', which are used to construct a composite image 200". In a method according to this embodiment of the invention, overlapping elements 250, 250' are taken from the component images 200, 200', reduced in size as a function of the zoom factor, and placed as subelements 232" within elements 230" to form the composite image 200". It will be understood that although only two such elements are shown for each component image (i.e., A1, A2, B1 and B2), the overlapping elements 250, 250' cover the entirety of the two component images 200, 200'. Each such element is located based on the configuration and frequency of the lens elements of the decoder and on the configuration of the subelements 232". In the embodiment shown in FIG. 4, the overlapping elements are centered on the locations of the subelements 232'.

In FIG. 4, the shaded area identified as Element A1 in the first component image is shrunk down three times in each dimension to create subelement A1 of the composite image (i.e., a zoom factor of 3 is applied). Subelement A1 is centered on the location corresponding to the center of Element A1 in the component image. The large square identified as Element A2 is shrunk down three times in each dimension to obtain subelement A2 of the composite image 200", which is similarly centered on the location corresponding to the center of the Element A2. Similar operations were performed to obtain subelements B1 and B2 of the composite image 200".

Figure 5:
FIG. 5 illustrates a composite image produced in a method according to an embodiment of the invention.

The effect of using a zoom factor to create the composite image is illustrated in FIG. 5, which shows a composite image 300 formed from the component images in FIG. 2. The composite image of FIG. 5 was formed using a zoom factor of 4, but it will be understood that the composite image may be formed using any zoom factor. Despite the scrambled appearance of the image portions that make up the composite image, placement of a decoder lens having a corresponding lens element array over the composite image results in the "reassembly" of the component images 10, 10' for viewing by an observer, allowing the observer to see the authentication image 20, 20'. The authentication images viewed by placing the decoder lens over a composite image formed after applying a zoom factor appear to move or "float" when as the observer changes his angle of view through the decoder. This results from the use of overlapping component portions that have been zoomed. The elements of the component images thus spread into multiple parts of the composite image. By adjusting the angle of view, the decoder makes viewable information from the multiple parts of the component image, thereby creating an illusion of floating. Generally, the bigger the zoom factor, the more pronounced the floating effect. On the other hand, by shrinking the portions of the component images by a zoom factor, the effective resolution of the component images may be decreased when seen through the decoding lenses.

In some embodiments of the invention, the subelements of the component images may be flipped before forming the composite image. Flipping portions of the component images changes the direction in which these portions appear to float when seen through the decoder. By alternating between flipping and not flipping the elements of the composite image, different parts of the component images may appear to float in opposite directions when seen through the decoder.

In certain instances, the above effects may be applied to a single component image (or two identical component images) that is used to produce a non-tonally balanced encoded image. Such images could be used, for example, in applications where a decoder lens is permanently affixed to the image. In such applications, tonal balancing is unnecessary because the authentication image is always viewable through the permanently affixed decoder lens.

In some embodiments of the invention, a composite image may be formed from more than one authentication (or other) image. For each such image, a plurality of component images may be created using the methods previously discussed. Portions from each component image may then be used to form a single composite image. For example, if it is desired to use two authentication images (Image 1 and Image 2), each image could be used to form two component images, each divided into elements and subelements as shown in FIGS. 2-4. This would produce four component images, each having corresponding elements and subelements. A composite image similar to those of FIGS. 3A and 3B could be formed by using a subelement A1 taken from a first component of Image 1 and a subelement A2 taken from a second component of Image 1. Similarly, a subelement B1 could be taken from a first component of Image 2 and a subelement B2 from a second component of Image 2. In another example, subelements A1 and B2 could be taken from components of Image 1 and subelements B1 and A2 could be taken from components of Image 2. The subelements could be ordered in multiple ways. The subelements could be ordered one below another, side by side, across the diagonal from each other, or in any other way. The composite image may produce the effect that the human observer may see the different authentication images depending on the angle of view through a decoder lens. The component images may alternate and switch when the angle of view is changed. Additionally, the zoom factor and flipping techniques may be used with this technique. This may create a multitude of effects available to the designer of the composite image. Any number of images may be hidden together in this manner and any number of component images may be used for each.

In some embodiments of the invention, different zoom factors can be used for the subelements coming from the different images. For example, a zoom factor of two may be used for the subelements coming from Image 1 and a zoom factor of eight may be used for the phases coming from Image 2. The subelements coming from the different images may appear to be at different depths when seen through the decoder. In this way, various 3D effects may be achieved.

Figure 6:
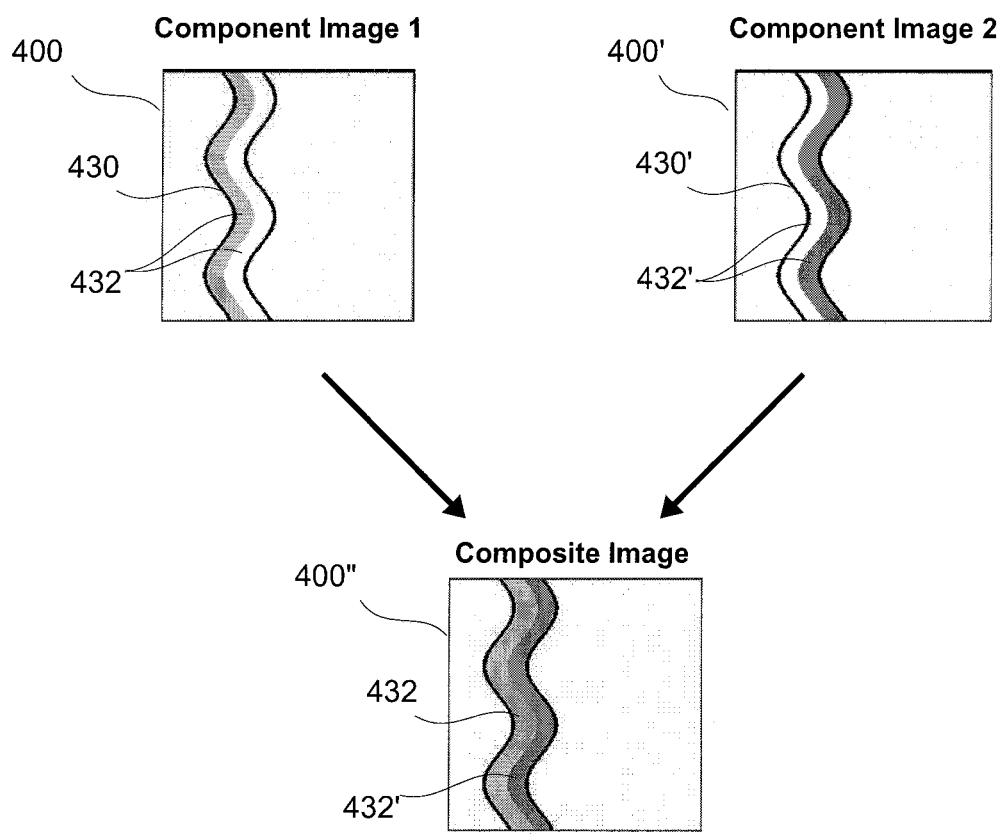
FIG. 6 is a schematic representation of component images used to produce a composite image according to an embodiment of the invention.

FIG. 6 illustrates an approach to collecting and ordering portions of the component images to form elements of a composite image that is decodable using a lenticular lens. In FIG. 6, two component images 400, 400' are divided into elements 430, 430' corresponding in shape and frequency to the lens elements of a lenticular decoder having "wavy" lenticules. As before, the component images are created so as to be balanced around a particular shade (or shades). The composite image 400" is again formed by assembling subelements 432, 432' from the component images 400, 400'. A zoom factor can be used if desired. In this example, the zoom factor is one, which indicates that the composite image elements are the same size as the component image elements (i.e., the component image elements are not shrunk). The approaches of collecting and ordering discussed above may also be applied for a wavy lenticular decoding lens or any other type of decoding lens. In this example, the portion of the first component image, which is the light gray portion, may be taken from the same geometrical position as the portion of the second component image, which is the dark gray portion. The portions of the component images may have equal size. The combined portions of the component images or the elements of the composite images may cover the area of a single decoding element in the composite image.

If the portions of the component images used to create a composite image are small enough and if the phases are balanced along the same color shade, all of the techniques described above may produce an image that looks like a tint, i.e. uniform color shade when printed.

Figure 7:
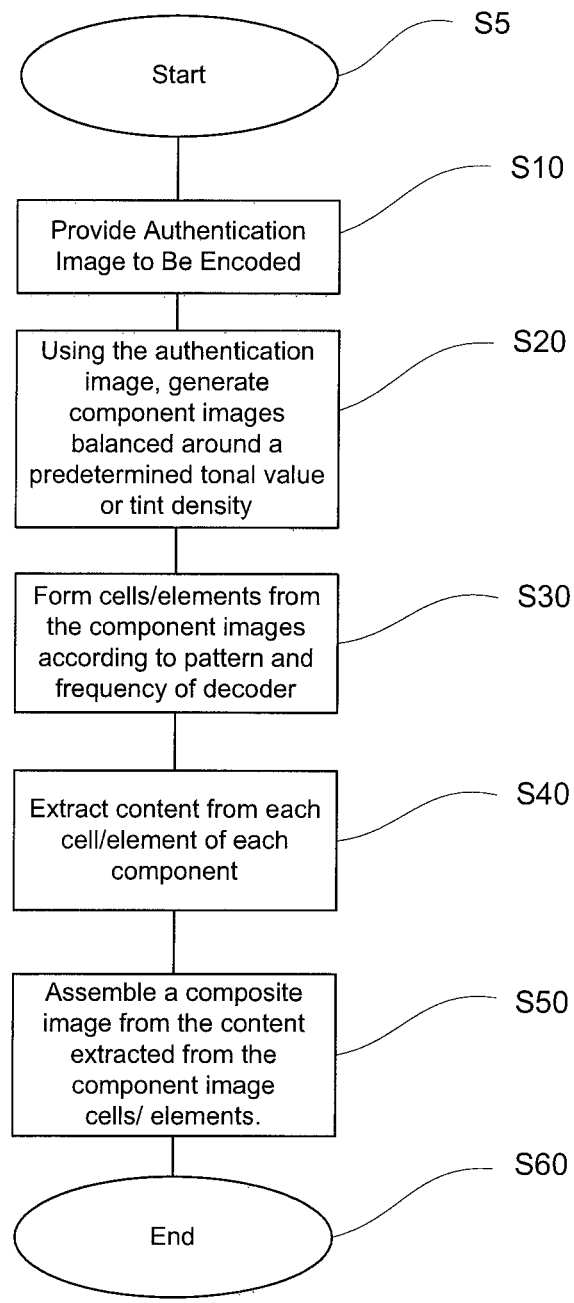
FIG. 7 is a flow diagram of a method of producing a composite image incorporating an authentication image according to an embodiment of the invention.

FIG. 7 illustrates a generalized method M100 of producing a composite authentication image according to an embodiment of the invention. The method M100 begins at S5 and at S10 an authentication image is provided. Using the authentication image, two or more component images are created at S20. As previously discussed, these component images are formed so that at each location, their tonal values are balanced around a predetermined tonal value or tint density. At S30, the image components are used to produce a plurality of image elements to be used to form a composite image. These composite image elements are formed and positioned according to a pattern and frequency of the elements of a decoder lens. As previously discussed, the component elements may be positioned and sized so as to provide a frequency that is the same as or a multiple of the frequency of the decoder. In some embodiments, the component image elements are constructed by dividing the composite image into non-overlapping elements or cells. In other embodiments, the component image elements may be formed as overlapping elements or cells.

At S40, content from each element of each of the component images is extracted. In embodiments where the component images are divided into non-overlapping elements, the action of extracting content may include subdividing each element of each component image into a predetermined number of subelements. The image content of a fraction of these subelements is then extracted. The fraction of subelements from which content is extracted is may be the inverse of the number of component images or a multiple thereof. Thus, if two component images are used, then half of the subelements are extracted from each element.

In embodiments where the component images are used to produce overlapping elements, the content of each entire element may be extracted. As previously described, a zoom factor may be applied to the extracted elements to produce subelements that can be used to form the composite image.

At S50, the extracted content from the component images is used to form a composite image. This may be accomplished by placing subelements from each of the components into locations corresponding to the locations in the component images from which the content of the subelements was extracted. The method ends at S60.

Any or all of the actions of the method M100 and any variations according to various embodiments of the invention may be carried out using any suitable data processor or combination of data processors and may be embodied in software stored on any data processor or in any form of non-transitory computer-readable medium. Once produced in digital form, the encoded composite images of the invention may be applied to a substrate by any suitable printing, embossing, debossing, molding, laser etching or surface removal or deposit technique. The images may be printed using ink, toner, dye, pigment, a transmittent print medium (as described in U.S. Pat. No. 6,980,654, which issued Dec. 27, 2005 and is incorporated herein by reference in its entirety), a non-visible spectrum (e.g., ultraviolet or infrared) print medium (as described in U.S. Pat. No. 6,985,607, which issued Jan. 10, 2006 and is incorporated herein by reference in its entirety).

It will be understood that there are a variety of ways in which balanced image components may be constructed. In various embodiments, balanced component image portions may be created by inverting the portions of one component image to form the portions of the second component. If this approach is used, the component images will be balanced around 50% density, and the composite image will appear to the naked eye as a 50% tint. When printed or otherwise displayed the elements of the composite image may be printed next to each other and the eye will average them out to (60%+40%)/2=50%. To obtain a lighter composite tint instead of 50%, both component images can be brightened by the same amount. For darker composite tint, both component images can be darkened by the same amount.

In some embodiments of the invention, a tint based composite image may be integrated or embedded into a primary image, such as any visible art. The composite image(s) may be hidden to the naked eye within the art work, but rendered visible when a decoder is placed on the printed visible artwork with composite image(s) integrated inside. All of the effects associated with the composite image (i.e. the appearance of floating, alternation of component image viewability, etc.) are retained.

One approach to this is to apply a halftone screening technique that uses the composite images as a screen file to halftone the visible artwork. This technique may modify the elements of the composite image by growing or shrinking them to mimic the densities of the pieces of the visible artwork image at the same positions.

Figure 8:
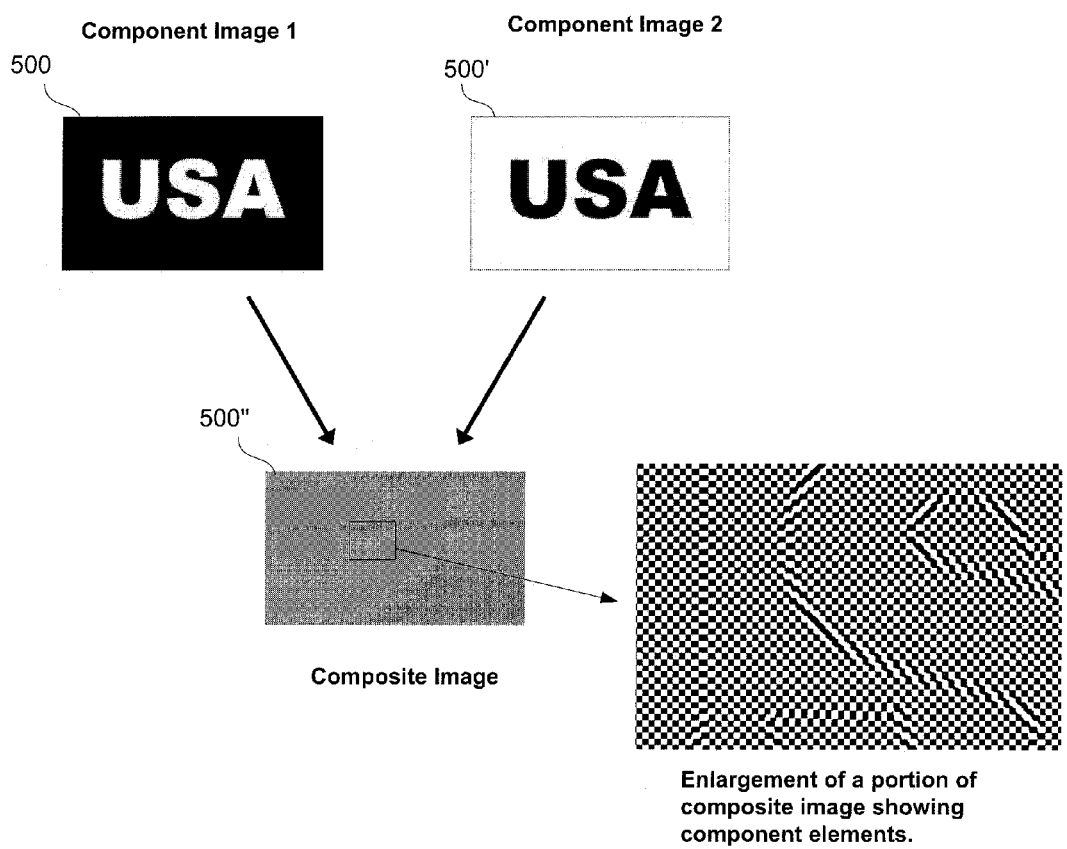
FIG. 8 is an illustration of component images used to produce a composite image according to an embodiment of the invention.
Figure 9:
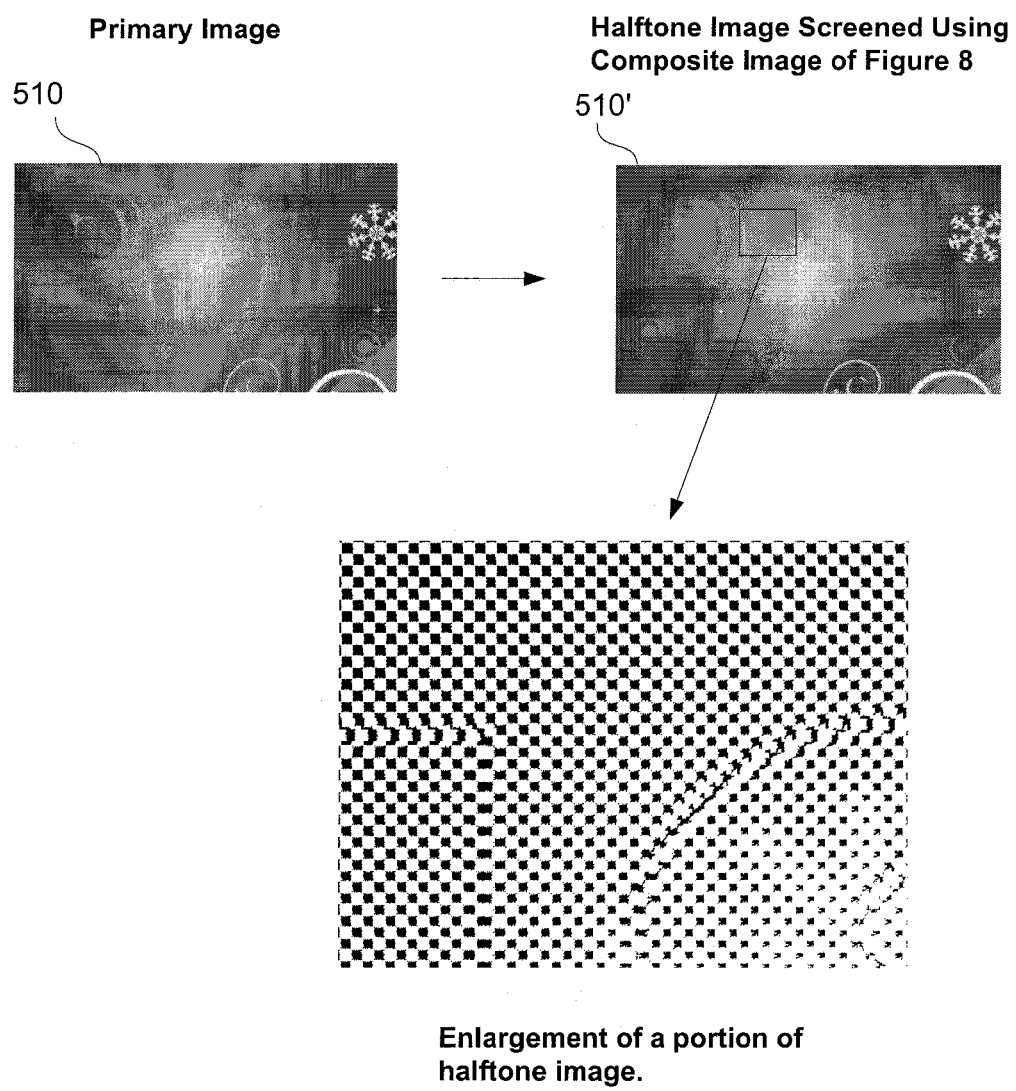
FIG. 9 is an illustration of a composite image formed from a primary image screened using the composite image of FIG. 8 in accordance with a method according to an embodiment of the invention.

FIGS. 8 and 9 illustrate an example of this approach. FIG. 8 illustrates two component images 500, 500' constructed based on a block letter "USA" authentication image, which are used to construct a composite image 500" formed from square elements of the two component images 500, 500". As has been discussed, the basic composite images produced according to the methods of the invention appear as single tone images to the naked eye. Magnification, however, shows that the composite image 500" is formed from a plurality of subelements. Each of these subelements is a square portion taken from a corresponding element of one of the component images 500, 500'. It will be understood that all of these subelements are the same size and shape. The appearance of varying sized rectangles in the enlarged area occurs as the result of the variation in content within the subelements. Placement of a corresponding decoder over the composite image 500" "reassembles" this content so that the component images 500, 500' with the authentication image can be viewed.

FIG. 9 illustrates a visible artwork image 510 along with a halftone 510' of the same image screened using the composite image 500" of FIG. 8. The unmagnified half-tone image 510' appears unchanged to the naked eye. Magnification, however, shows that the image 510' is made up of the square elements of the composite image, which have been modified according to the tone density of the original image 510. In effect, the composite image 500" of FIG. 8 is embedded within the primary image 510. When a decoder is placed over the encoded image (i.e., the halftone artwork 510'), the component images 500, 500' will be visible.

Figure 10:
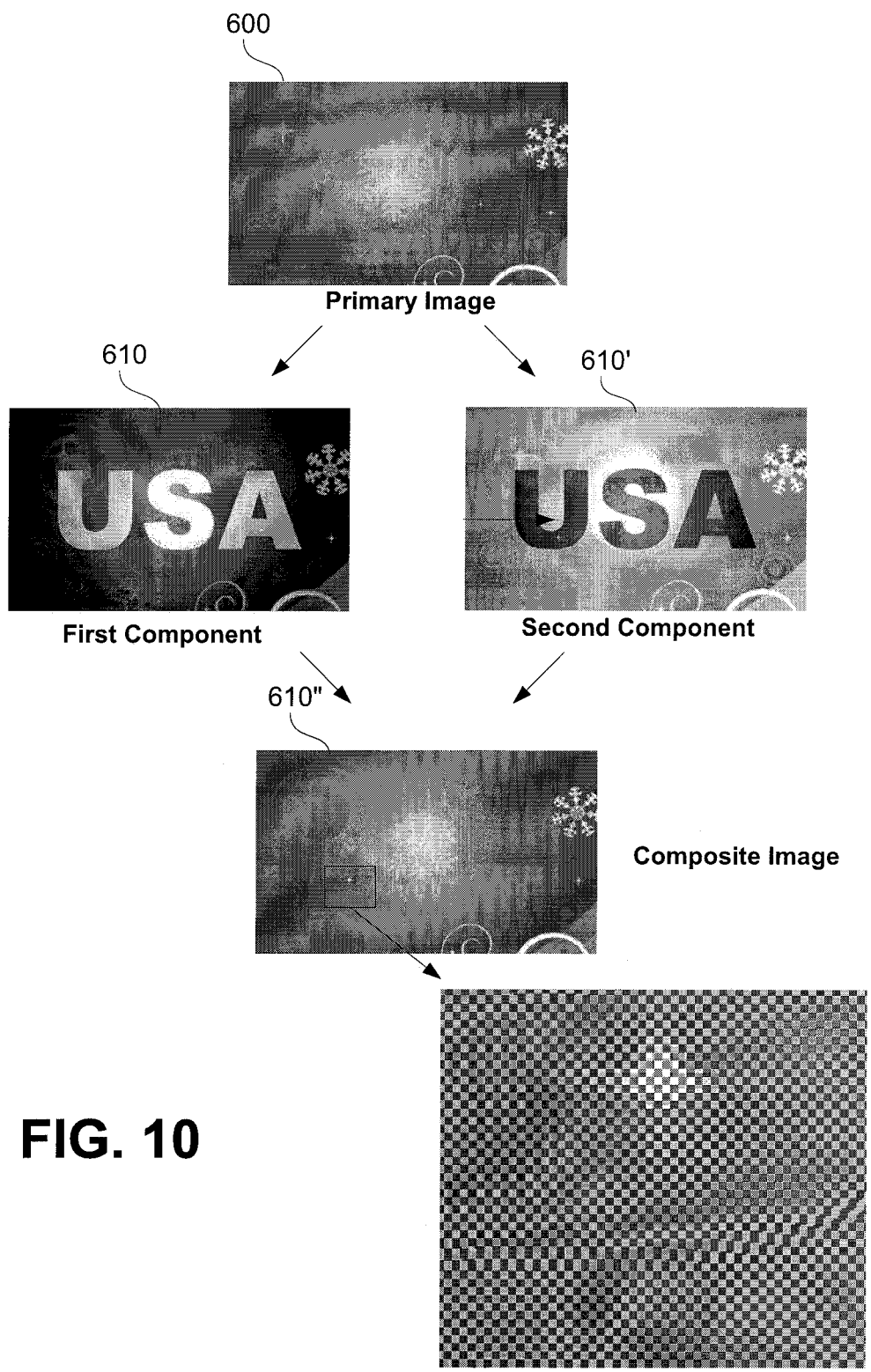
FIG. 10 illustrates component images formed from a primary image and used to produce a composite image using a method according to an embodiment of the invention.

FIG. 10 illustrates another approach to hiding a secondary image within visible artwork. As was previously discussed, component images may be formed by tonally balancing corresponding locations around different tone densities in different areas. This approach can be used to create component images 610, 610' from a primary visible image 600 as shown in FIG. 10. One approach to this is to darken the primary image 600 to create a first replica image and correspondingly lighten the primary image 600 to create a second replica image. An area matching an authentication image may be masked from each of the replica images and replaced in each case by the content from the masked area of the other replica. In the example illustrated in FIG. 10, the areas matching the letters "USA" (i.e. the authentication image) are essentially swapped between the replica images to produce the component images 610, 610'. The component images may then be sampled and combined to create the composite image 610" using any of the techniques previously discussed. The composite encoded image 610" closely resembles the original primary image 600, but with the hidden message "USA" being viewable using a decoder lens corresponding to the size and configuration of the elements used to form the subelements of the composite image 610".

Figure 11:
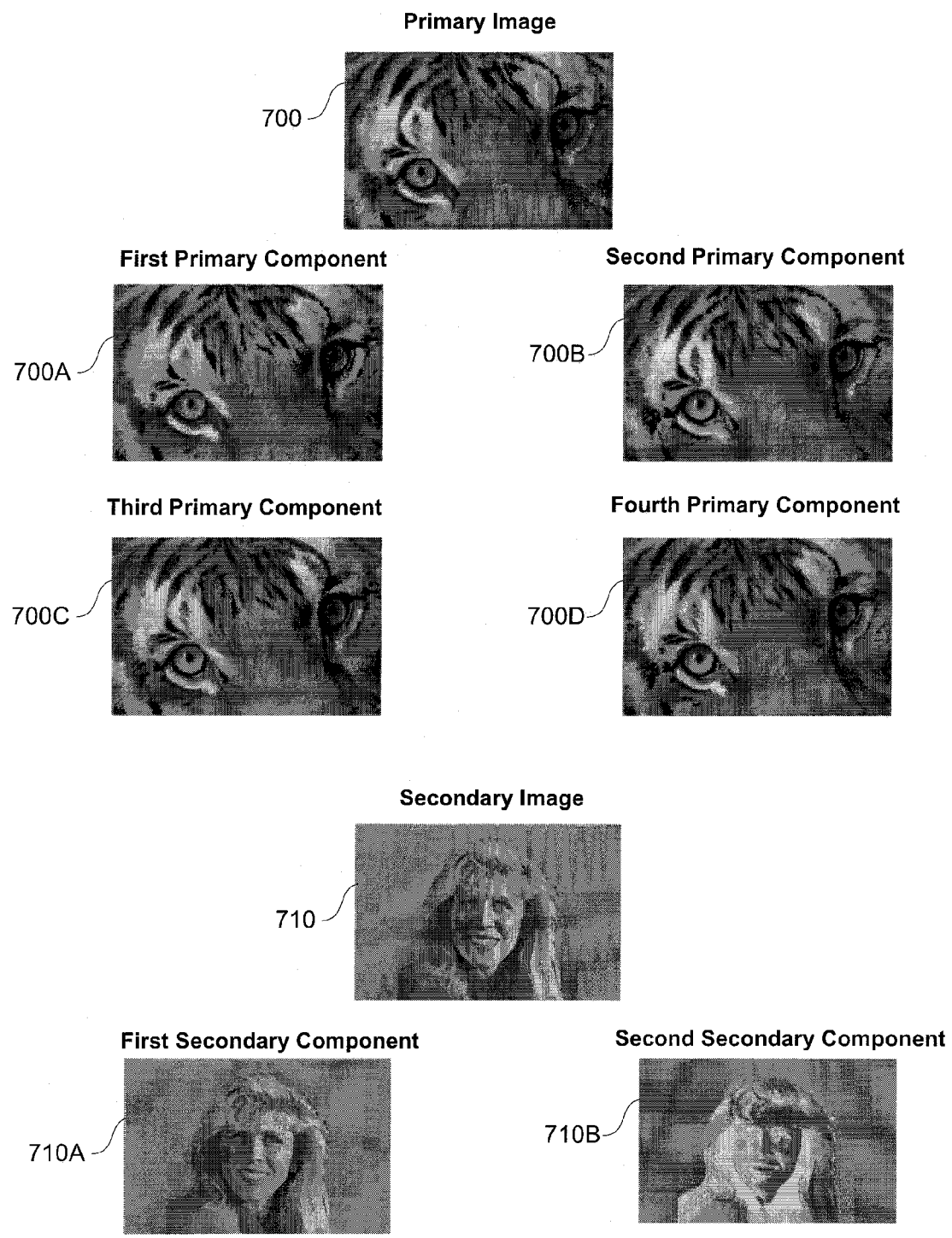
FIG. 11 illustrates primary and secondary component images that were used to produce a composite image using a method according to an embodiment of the invention.
Figure 12:
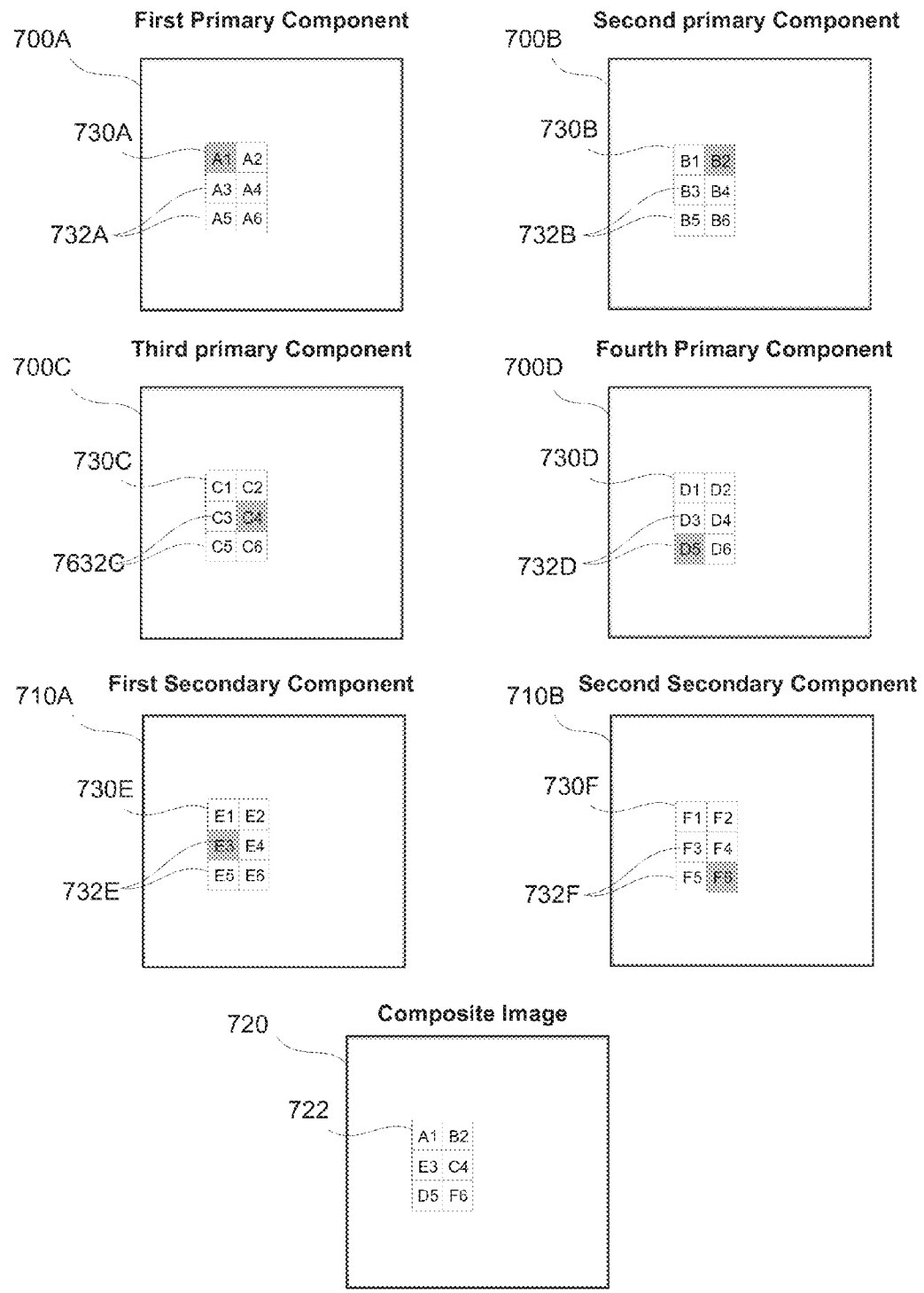
FIG. 12 is a schematic representation of the elements of a series of component images used to produce a composite image using a method according to an embodiment of the invention.

Another approach to hiding a secondary image within a primary image is to use both the primary and secondary images to create component images. This approach is illustrated in FIGS. 11 and 12. FIG. 11 illustrates (in gray scale) a color primary image 700 of a tiger, and a color secondary image 710 of a girl. In this example, the primary image 700 is used to form four identical component images 700A, 700B, 700C, 700D, which are divided into elements 730A, 730B, 730C, 730D as shown in FIG. 12. As in previous examples, only a single element is shown for each component image, but it will be understood that the elements are formed from the entire component image. It will also be understood that, for demonstration purposes, the elements in FIG. 12 are depicted much larger than actual elements used in the methods of the invention. In the illustrated embodiment, each of the elements of the four components is divided into subelements 732A, 732B, 732C, 732D. Because, in this example, a total of six components are used to produce the composite image, the component image elements are divided into six subelements.

It will be understood that, in practice, it is not actually necessary to create separate component images of the primary image. The primary image itself can be used to produce the elements and subelements used to construct the composite image.

The secondary image 710 is used to produce two component images 710A, 710B. the second component image 710B is produced as an inverse of the first component image 710A. The first and second component images 710A, 710B are divided into elements 730E, 730F, which may be non-overlapping elements (as shown in FIG. 12) or as overlapping elements like those shown in FIG. 4. As with the primary component images, each of the elements of the secondary components 710A, 710B is divided into subelements 732E, 732B, 732C, 732D. Again, six subelements are formed from each element.

In this example, the goal is for the primary image to be visible to the naked eye and the secondary image to be visible with the assistance of a decoder lens corresponding to the frequency of the elements of the component images. Thus, in constructing the composite image, the majority of the subelements used are taken from the primary component images. In the illustrated example, four (A1, B2, C4 and D5) of the six subelements used in each element 722 of the composite image 720 are taken from the four primary component images that are identical to the primary image. The other two subelements (E3 and F6) used in the element 722 are taken from the secondary composite images 710A, 710B, and are interlaced with the four subelements from the primary image. Because the subelements taken from the secondary image are compensated (original image tint for one subelement and its inverse for the other subelement), they will not be visible to the naked eye. In other words, the eye will mix them up into a 50% tint. As in previous embodiments, the subelements used and their placement within the element 722 of the composite image 720 can vary.

Because the subelements coming from the primary image 700 are not changed in any way, an observer will still see the image of the tiger in the composite image 720 with a naked eye. Under a properly oriented decoder lens, however, the components will be separated so that, for some angles of view the observer will see the primary image (e.g., the tiger of FIG. 11), for other angles of view, the observer will see the secondary image (e.g., the girl of FIG. 11), and for yet other angles of view the observer will see the inverse of the secondary image. In this way, a color secondary image and its inverse are hidden inside the color primary image. Element flipping and/or a zoom factor larger than one can be applied to the component images created from the secondary image, thus adding additional effects to the decoded image.

In a variation to the above embodiment, instead of using a majority of subelements from the primary image for each composite element, the primary image can be preprocessed to increase its contrast. This allows the reduction of the number of subelements that must be taken from the primary in order to hide the authentication image.

In any of the embodiments described herein, the images used to create a composite image may be binary, grayscale, color images, or a combination of any type of image. In this way, the components revealed with the decoding lens may be binary, grayscale or color images.

Figure 13:
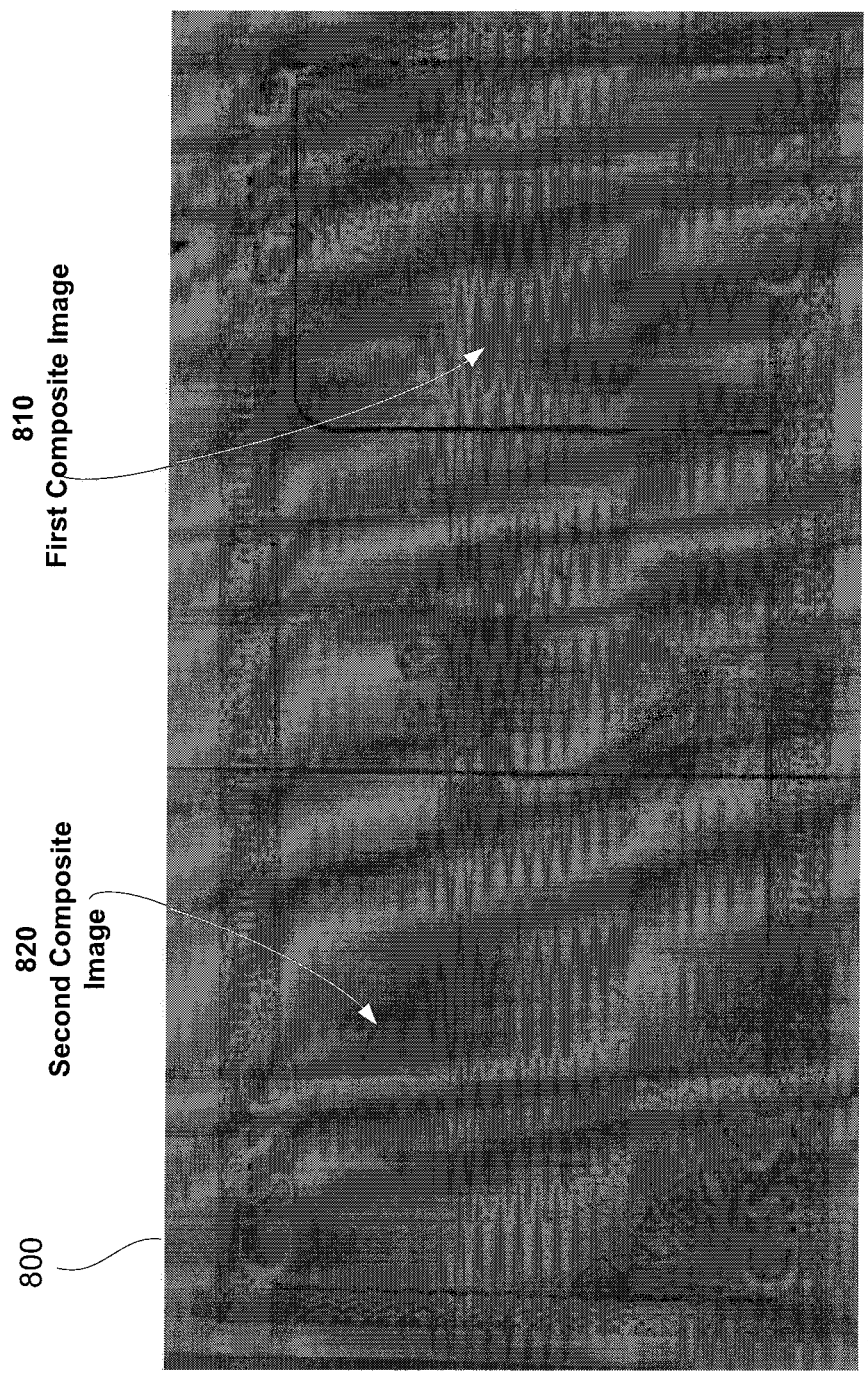
FIG. 13 is a photograph of an example document to which composite images produced using methods of the invention were applied.
Figure 14:
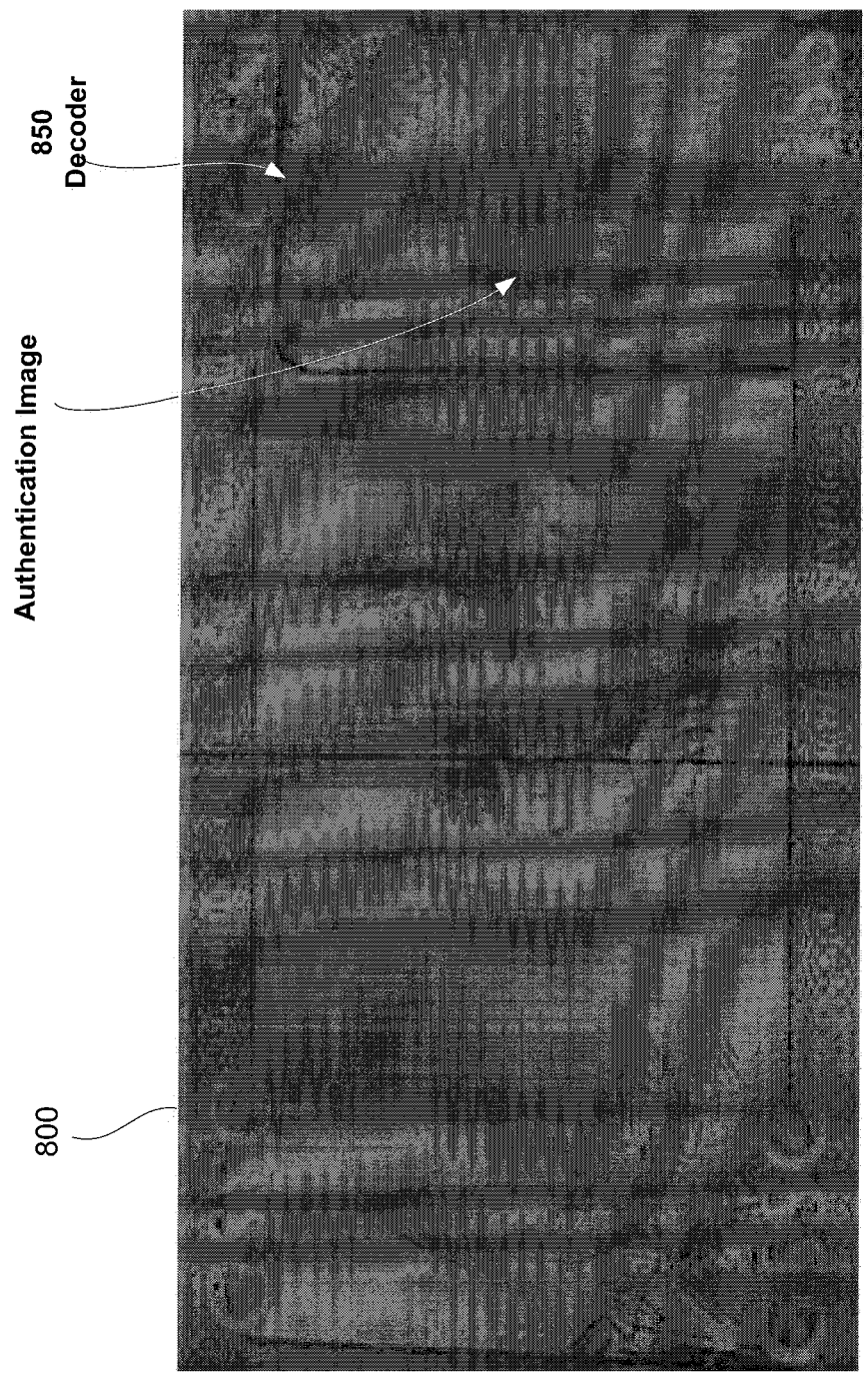
FIG. 14 is a photograph illustrating the use of a decoder lens to view an authentication image incorporated into a composite image applied to the document shown in FIG. 13.
Figure 15:
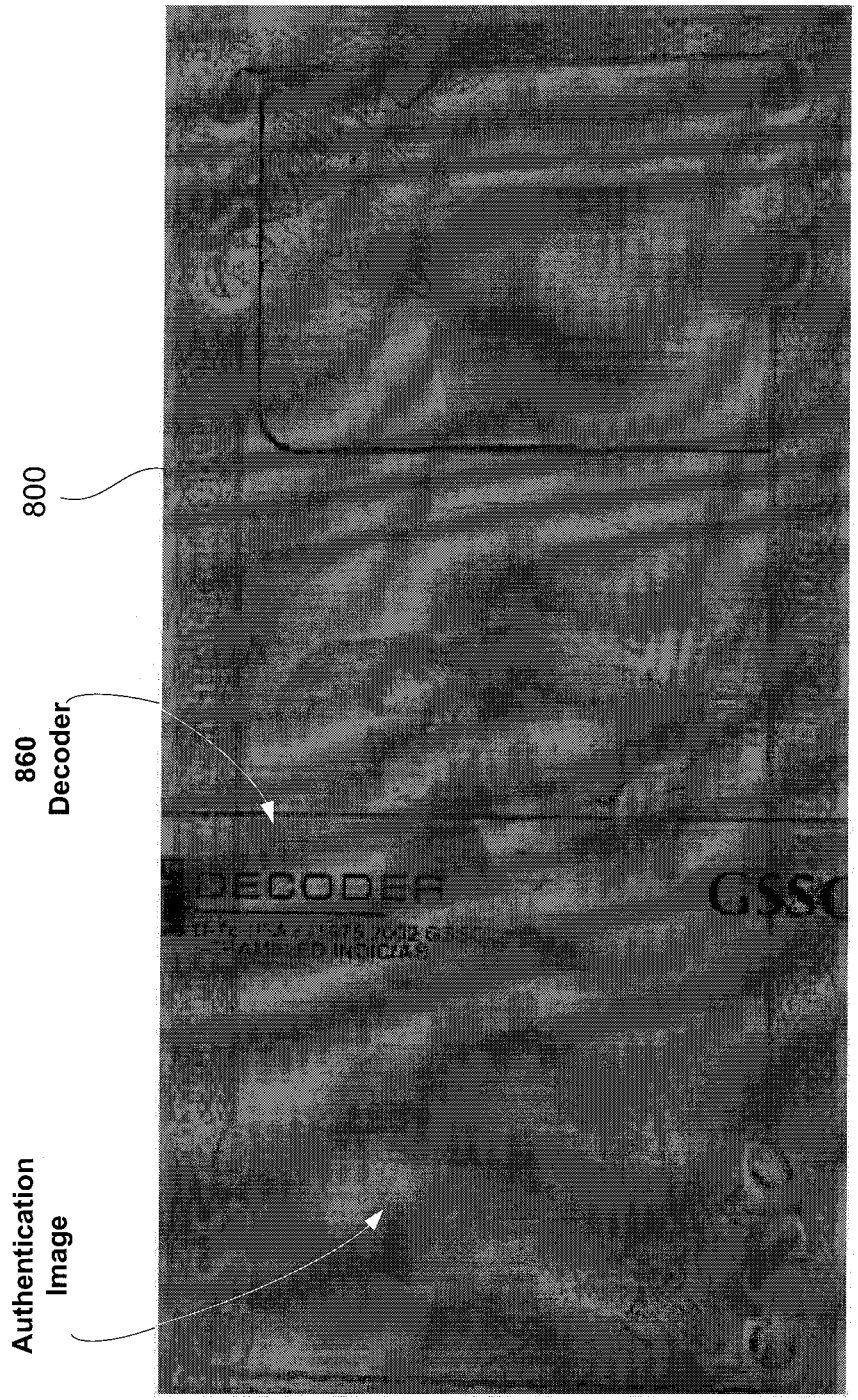
FIG. 15 is a photograph illustrating the use of a decoder lens to view an authentication image incorporated into a composite image applied to the document shown in FIG. 13.

FIGS. 13-15 illustrate examples of the application to an object of authentication images produced according to embodiments of the present invention each having a primary image formed as a composite image according to a method of the present invention. FIG. 13 is a photographic image of a simulated document 800 to which composite images 810, 820 of the present invention have been applied. The first composite image 810 appears as a silhouette of a featureless, single tone cube on the right side of the document. The second composite image 820 has a primary image of an oval with the letters "SI" at its center. FIG. 14 shows the same document 800 with a decoder lens 850 placed over the area of the first composite image 810. Because the decoder 850 has a frequency corresponding to the frequency used to produce the first composite image 810 and is properly aligned with the elements of the image, the authentication image (the characters "SI" and "USA") are visible when the cube is viewed through the decoder lens 850. FIG. 15 illustrates a similar placement of a decoder lens 860 over the second composite image. Depending on the parameters used to create the to composite images 810, 820, the decoder lens 860 may or may not be the same as or have the same optical characteristics as the first decoder lens 850. When the decoder 860 is placed in the proper orientation as shown, the image of a head appears when viewed through the decoder 860. Both composite images 810, 820 were produced using overlapping elements to which a zoom factor was applied and, as a result, the two authentication images appear to "float" when the viewer changes the angle at which he views the image through the decoders 850, 860 (not viewable in static illustrations of FIGS. 14 and 15).

When the composite images produced according to the various embodiments of the invention are printed or otherwise applied to an object, the component images used to produce the composite images may be viewed by application of a corresponding decoder lens. The decoder lens may be virtually any form of lens having multiple lens elements and the lens elements may be formed in virtually any pattern (symmetric or asymmetric, regularly or irregularly spaced) and have any shape. Authentication may be accomplished by comparing the content of the image viewed through the decoder to the expected content for an authentic object to which the composite image has been applied. the component images may also be viewable through the use of a software-based decoder such as those described in U.S. Pat. Nos. 7,512,249 and 7,630,513, the complete disclosure of which are incorporated herein by reference in their entirety. As described in the '249 and '513 Patents, an image of an area where an encoded image is expected to appear can be captured using an image capturing device such as a scanner, digital camera, or telecommunications device and decoded using a software-based decoder. In some embodiments, such a software-based decoder may decode a composite image by emulating the optical properties of the corresponding decoder lens. Software-based decoders may also be used to decode a digital version of a composite image of the invention that has not been applied to an object.

The use of software-based decoders also provides the opportunity to create encoded composite images using more complicated element patterns. As was previously noted, some lens element patterns and shapes may be so complex that it they are impossible or impractical to manufacture optical lenses that make use of them. These difficulties, however, do not apply to the techniques used to create the images of the present invention and, moreover, do not apply to software-based decoders. The methods of the present invention can make use of a "software lens" having lens elements that have a variable frequency, complex and/or irregular shapes (including but not limited to ellipses, crosses, triangles, randomly shaped closed curves or polygons), variable dimensions, or a combination of any of the preceding characteristics. The methods of the invention can be applied based on the specified lens configuration, even if this configuration cannot be practically manufactured. The methods of creating composite images from component images as described herein are based on the innovative use of simple geometric transformations, such as mapping, scaling, flipping etc, and do not require a physical lens to be created for this purpose. Just having a lens configuration, or specification, is enough to apply this method. Some or all of the characteristics of the software lens could then be used by a software decoder to decode the encoded composite image to produce decoded versions of the component images used to create the composite image.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. An automated method for constructing a composite image having an authentication image formed therein, the authentication image being viewable by placement of a decoder lens having a plurality of lens elements defining one or more decoder lens frequencies over an object to which the composite image has been applied, the method comprising:
   generating a first plurality of component images in which corresponding tonal areas are tonally balanced around at least one tonal value, at least one of the component images being configured to include a representation of the authentication image;
   determining a pattern of component image elements for each of the component images, the pattern including an element configuration and at least one element frequency that is equal to or a multiple of one of the decoder lens frequencies, the component image elements for a given component image collectively carrying all the content of that component image;
   extracting at least a portion of the content of each component image element of each component image; and
   constructing a composite image having a pattern of composite image elements having the at least one element frequency that is equal to or a multiple of one of the decoder lens frequencies, each composite image element including the extracted content from a component image element from each component image in a location in the component image that corresponds to the location in the composite image.

2. An automated method according to claim 1 wherein the component image elements are overlapping elements and the method further comprises:
   applying a predetermined element reduction factor to reduce the size of each component element to form a subelement,
   wherein the subelement defines the content extracted from each component image element in the extracting action.

3. An automated method according to claim 2 wherein the action of constructing a composite image includes placing each subelement in the composite image so that the subelement is centered on a point corresponding to a center point of the composite image element from which the subelement was formed.

4. An automated method according to claim 1 further comprising:
   subdividing each component element into a number of subelements to form a subelement pattern.

5. An automated method according to claim 4 wherein the number of subelements is equal to or a multiple of the number of component images.

6. An automated method according to claim 4 wherein at least a portion of the subelements have a geometric shape selected from the group consisting of a polygon, an ellipse, a partial ellipse, a circle, and a partial circle.

7. An automated method according to claim 4 wherein the at least a portion of the content of each component image element of each component image includes one or more of the subelements of the component image element.

8. An automated method according to claim 4 wherein the action of constructing a composite image includes placing at least one subelement from each component image element of each component image into a composite image element subdivided into the subelement pattern and positioned at a location corresponding to the location of the component image element from which the subelement was extracted.

9. An automated method according to claim 1 wherein some or all of the at least a portion of the content of each component image element of a selected one of the component images is flipped about an axis of the component image element.

10. An automated method according to claim 1 wherein the decoder lens is a lenticular lens having a single lenticular lens frequency and the component image elements are configured as elongate segments having a predetermined width and spaced apart so as to define an element frequency that is equal to or a multiple of the lenticular lens frequency.

11. An automated method according to claim 10 wherein the lens elements and the elongate segments are curvilinear.

12. An automated method according to claim 1 wherein the decoder lens is a fly's eye lens having a two dimensional array of lens elements having a predetermined lens element shape and a plurality of lens frequencies and wherein the pattern of component image elements corresponds to the pattern of the fly's eye lens.

13. An automated method according to claim 12 wherein the component image elements have a shape corresponding to the predetermined lens element shape.

14. An automated method according to claim 1 further comprising:
screening a visible artwork image using the composite image to produce a half-tone image of the visible artwork image having the authentication image incorporated therein, the authentication image being non-viewable to the naked eye, but viewable through the decoder lens when the decoder lens is placed over the half-tone image.

15. An automated method according to claim 1 wherein each component image is formed from the same visible artwork image, the visible artwork image having varying tonal densities and the component images being formed so that they are balanced around the varying tonal densities of the visible artwork image at each corresponding location within the component images.

16. An automated method according to claim 15 wherein the action of generating a first plurality of component images includes:
forming a first replication of the visible artwork image in which the tone density of all content is darker than in the visible artwork image;
forming a second replication of the visible artwork image in which the tone density of all content is lighter than in the visible artwork image;
masking a portion of the first replication using the authentication image;
masking a portion of the second replication using the authentication image;
replacing the masked portion of the first replication with the masked portion of the second replication to form a first component image; and
replacing the masked portion of the second replication with the masked portion of the first replication to form a second component image.

17. An automated method according to claim 16 wherein the first replication is darker than the visible artwork image by a first percentage that is equal to a second percentage by which the second replication is lighter that the visible artwork image.

18. An automated method according to claim 1 further comprising:
generating a second plurality of component images, each of the second plurality of component images being a replication of a visible artwork image,
wherein the second plurality of component images is greater in number than the first plurality of component images.

19. An automated method according to claim 1 further comprising:
applying the composite image to an object to be authenticated.

20. An automated method according to claim 19 wherein the action of applying the composite image includes at least one of the set consisting of printing the composite image on a surface of the object and embossing, debossing, molding or otherwise altering a surface geometry of the object according to the composite image.

21. A non-transitory computer-readable medium having software code stored thereon, the software code being configured to cause a computer to execute a method for constructing a composite image having an authentication image formed therein, the authentication image being viewable by placement over of a decoder lens having a plurality of lens elements defining one or more decoder lens frequencies over an object to which the composite image has been applied, the method comprising:
generating a first plurality of component images in which corresponding tonal areas are tonally balanced around at least one tonal value, at least one of the component images being configured to include a representation of the authentication image;
determining a pattern of component image elements for each of the component images, the pattern including an element configuration and at least one element frequency that is equal to or a multiple of one of the decoder lens frequencies, the component image elements for a given component image collectively carrying all the content of that component image;
extracting at least a portion of the content of each component image element of each component image; and
constructing a composite image having a pattern of composite image elements having the at least one element frequency that is equal to or a multiple of one of the decoder lens frequencies, each composite image element including the extracted content from a component image element from each component image in a location in the component image that corresponds to the location in the composite image.

22. A non-transitory computer-readable medium according to claim 21 wherein the component image elements are overlapping elements and the method further comprises:

applying a predetermined element reduction factor to reduce the size of each component element to form a subelement, wherein the subelement defines the content extracted from each component image element in the extracting action.

23. A non-transitory computer-readable medium according to claim 21 wherein the method further comprises:

subdividing each component element into a number of subelements to form a subelement pattern, the number of subelements being equal to or a multiple of the number of component images, and wherein the at least a portion of the content of each component image element of each component image includes one or more of the subelements of the component image element.

24. A non-transitory computer-readable medium according to claim 21 wherein the method further comprises:

screening a visible artwork image using the composite image to produce a half-tone image of the visible artwork image having the authentication image incorporated therein, the authentication image being non-viewable to the naked eye, but viewable through the decoder lens when the decoder lens is placed over the half-tone image.

25. A non-transitory computer-readable medium according to claim 21 wherein each component image is formed from the same visible artwork image, the visible artwork image having varying tonal densities and the component images being formed so that they are balanced around the varying tonal densities of the visible artwork image at each corresponding location within the component images.

26. An authenticatable object comprising:

A receiving surface configured for receiving a composite security image; and a composite security image applied to the receiving surface, the composite security image comprising:

a plurality of composite elements each comprising a subelement extracted from a component element of each of a plurality of component images in which corresponding tonal areas are tonally balanced around at least one tonal value, at least one of the component images being configured to include a representation of an authentication image;

a pattern of component image elements for each of the component images, the pattern including an element configuration and at least one element frequency that is equal to or a multiple of one or more decoder lens frequencies, the component image elements for a given component image collectively carrying all the content of that component image; and a composite image having a pattern of composite image elements having the at least one element frequency that is equal to or a multiple of the one or more decoder lens frequencies, each composite image element including content extracted from a component image element from each component image in a location in the component image that corresponds to the location in the composite image, the authentication image being viewable through a decoder lens placed over the composite security image.

* * * * *